(12) United States Patent
Hadjigeorge et al.

(10) Patent No.: US 8,920,630 B2
(45) Date of Patent: Dec. 30, 2014

(54) SYSTEMS AND METHODS FOR MAKING A MIDDLE DISTILLATE PRODUCT AND LOWER OLEFINS FROM A HYDROCARBON FEEDSTOCK

(75) Inventors: George A. Hadjigeorge, Sugar Land, TX (US); Weijian Mo, Sugar Land, TX (US); Colin John Schaverien, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1150 days.

(21) Appl. No.: 12/595,742

(22) PCT Filed: Apr. 10, 2008

(86) PCT No.: PCT/US2008/059825
§ 371 (c)(1),
(2), (4) Date: Mar. 11, 2010

(87) PCT Pub. No.: WO2008/127956
PCT Pub. Date: Oct. 23, 2008

(65) Prior Publication Data
US 2010/0163455 A1 Jul. 1, 2010

Related U.S. Application Data

(60) Provisional application No. 60/911,715, filed on Apr. 13, 2007.

(51) Int. Cl.
| | | |
|---|---|---|
| *C10G 3/00* | (2006.01) | |
| *C10G 11/18* | (2006.01) | |
| *C10G 51/04* | (2006.01) | |
| *C10G 51/06* | (2006.01) | |
| *C10G 51/00* | (2006.01) | |
| *C10G 51/02* | (2006.01) | |

(52) U.S. Cl.
CPC ............... *C10G 11/18* (2013.01); *C10G 51/00* (2013.01); *C10G 51/026* (2013.01); *C10G 51/06* (2013.01); *C10G 3/49* (2013.01); *C10G 3/57* (2013.01); *C10G 3/62* (2013.01); *C10G 2300/1044* (2013.01); *C10G 2300/1037* (2013.01); *C10G 2300/1014* (2013.01); *C10G 2300/1018* (2013.01); *C10G 2300/1059* (2013.01); *C10G 2400/04* (2013.01); *C10G 2400/20* (2013.01)
USPC ............... 208/74; 208/77; 208/113; 585/240; 585/324

(58) Field of Classification Search
USPC ........ 208/72–74, 77, 113; 585/240, 324, 326, 585/327
See application file for complete search history.

(56) References Cited

U.S. PATENT DOCUMENTS

| | | |
|---|---|---|
| 3,130,007 A | 4/1964 | Breck ............................. 23/113 |
| 3,748,251 A | 7/1973 | Demmel et al. |

(Continued)

FOREIGN PATENT DOCUMENTS

| | | |
|---|---|---|
| EP | 0021787 | 7/1981 |
| EP | 96996 | 12/1983 |

(Continued)

OTHER PUBLICATIONS

Meier, W.M., et al: Atlas of Zeolite Structure Types, Eds. W.H. Meier and D.H. Olson, Butterworth-Heineman, 3rd, 1992, p. 453.

(Continued)

*Primary Examiner* — Renee E Robinson

(57) ABSTRACT

A system comprising a riser reactor comprising a gas oil feedstock and a first catalyst under catalytic cracking conditions to yield a riser reactor product comprising a cracked gas oil product and a first used catalyst; a intermediate reactor comprising at least a portion of the cracked gas oil product and a second catalyst under high severity conditions to yield a cracked intermediate reactor product and a second used catalyst; wherein the intermediate reactor feedstock comprises at least one of a fatty acid and a fatty acid ester.

12 Claims, 2 Drawing Sheets

(56) References Cited

U.S. PATENT DOCUMENTS

| | | |
|---|---|---|
| 3,761,391 A | 9/1973 | Conner |
| 3,770,614 A | 11/1973 | Graven .................... 208/62 |
| 3,832,449 A | 8/1974 | Rosinski et al. ............. 423/328 |
| 3,894,933 A | 7/1975 | Owen et al. |
| 3,928,172 A | 12/1975 | Davis, Jr. et al. |
| 3,948,758 A | 4/1976 | Bonacci et al. ............... 208/92 |
| 3,974,062 A | 8/1976 | Owen et al. |
| 4,016,245 A | 4/1977 | Plank et al. ................ 423/328 |
| 4,051,013 A | 9/1977 | Strother |
| 4,076,842 A | 2/1978 | Plank et al. ................ 423/328 |
| 4,111,793 A | 9/1978 | Kolombos et al. |
| 4,254,297 A | 3/1981 | Frenken et al. ............. 585/640 |
| 4,309,280 A | 1/1982 | Rosinski et al. |
| 4,310,440 A | 1/1982 | Wilson et al. ............... 252/435 |
| 4,368,114 A | 1/1983 | Chester et al. .............. 208/120 |
| 4,422,925 A | 12/1983 | Williams et al. |
| 4,440,871 A | 4/1984 | Lok et al. .................... 502/214 |
| 4,500,651 A | 2/1985 | Lok et al. .................... 502/208 |
| 4,711,710 A | 12/1987 | Chen et al. |
| 4,731,174 A | 3/1988 | Occelli et al. |
| 4,803,186 A | 2/1989 | Chen et al. |
| 4,830,728 A | 5/1989 | Herbst et al. |
| 4,830,729 A | 5/1989 | Dessau et al. |
| 4,927,523 A | 5/1990 | Donnelly |
| 4,929,337 A | 5/1990 | Herbst et al. |
| 4,994,591 A | 2/1991 | Anderson et al. |
| 5,000,837 A | 3/1991 | Harandi |
| 5,009,769 A | 4/1991 | Goelzer |
| 5,055,437 A | 10/1991 | Herbst et al. |
| 5,156,817 A | 10/1992 | Luckenbach |
| 5,168,086 A | 12/1992 | Cheng et al. |
| 5,234,575 A | 8/1993 | Haag et al. |
| 5,234,578 A | 8/1993 | Stine et al. |
| 5,318,696 A | 6/1994 | Kowalski |
| 5,372,704 A | 12/1994 | Harandi et al. |
| 5,435,906 A | 7/1995 | Johnson et al. |
| 5,451,313 A | 9/1995 | Wegerer et al. |
| 5,521,264 A | 5/1996 | Mehra et al. |
| 5,547,564 A | 8/1996 | Cheng et al. ................. 208/122 |
| 5,565,176 A | 10/1996 | Johnson et al. |
| 5,730,859 A | 3/1998 | Johnson et al. |
| 5,888,378 A | 3/1999 | Kowalski |
| 5,944,892 A | 8/1999 | Li |
| 5,944,982 A | 8/1999 | Lomas ......................... 208/164 |
| 5,965,012 A | 10/1999 | Lomas |
| 6,106,697 A | 8/2000 | Swan et al. |
| 6,123,832 A | 9/2000 | Ho et al. |
| 6,166,282 A | 12/2000 | Miller |
| 6,258,257 B1 | 7/2001 | Swann, III et al. |
| 6,287,522 B1* | 9/2001 | Lomas .......................... 422/144 |
| 6,339,180 B1* | 1/2002 | Ladwig et al. ............... 585/330 |
| 6,455,750 B1 | 9/2002 | Steffens et al. |
| 6,538,169 B1 | 3/2003 | Pittman et al. |
| 6,656,344 B1 | 12/2003 | Rao et al. |
| 6,723,227 B1 | 4/2004 | Samson |
| 6,767,451 B2 | 7/2004 | Espeillac et al. |
| 6,791,002 B1 | 9/2004 | Abrevaya et al. |
| 6,835,302 B2 | 12/2004 | Cammy et al. |
| 6,866,771 B2 | 3/2005 | Lomas et al. |
| 7,029,571 B1 | 4/2006 | Bhattacharyya et al. |
| 7,033,546 B2 | 4/2006 | Lomas |
| 7,041,259 B2 | 5/2006 | Cammy et al. |
| 7,083,762 B2 | 8/2006 | Kuechler et al. |
| 7,102,050 B1 | 9/2006 | Lattner et al. |
| 7,112,307 B2 | 9/2006 | Abrevaya et al. |
| 7,122,160 B2 | 10/2006 | Brookhart |
| 7,169,293 B2 | 1/2007 | Lomas et al. |
| 7,195,741 B2 | 3/2007 | Lattner et al. |
| 7,261,807 B2 | 8/2007 | Henry et al. |
| 7,276,149 B2 | 10/2007 | Beech et al. |
| 7,312,370 B2 | 12/2007 | Pittman et al. |
| 7,582,203 B2 | 9/2009 | Mo et al. |
| 2002/0003103 A1 | 1/2002 | Henry et al. |
| 2003/0116471 A1 | 6/2003 | Zhang et al. |
| 2003/0121825 A1 | 7/2003 | Pittman et al. |
| 2003/0196932 A1 | 10/2003 | Lomas |
| 2005/0003957 A1 | 1/2005 | Vaughn et al. |
| 2005/0074371 A1 | 4/2005 | Lomas et al. |
| 2005/0118076 A1 | 6/2005 | Lomas |
| 2006/0076269 A1 | 4/2006 | Lomas |
| 2006/0113217 A1 | 6/2006 | Andreux et al. |
| 2006/0178546 A1 | 8/2006 | Mo et al. |
| 2006/0186020 A1* | 8/2006 | Gomes ........................... 208/46 |
| 2006/0191820 A1 | 8/2006 | Mo et al. |
| 2006/0229483 A1 | 10/2006 | Kuechler et al. |
| 2006/0283777 A1 | 12/2006 | Alvarenga Baptista et al. |
| 2007/0007176 A1 | 1/2007 | Pinho et al. |
| 2007/0015947 A1* | 1/2007 | Marker ......................... 585/648 |
| 2007/0122316 A1 | 5/2007 | Lomas et al. |

FOREIGN PATENT DOCUMENTS

| | | | |
|---|---|---|---|
| EP | 168979 | 1/1986 | |
| EP | 229295 | 7/1987 | ............. C10G 45/64 |
| EP | 0305720 | 3/1989 | |
| EP | 325437 | 7/1989 | ............. C10G 11/18 |
| EP | 0325437 | 7/1989 | |
| EP | 0490435 | 8/1994 | |
| EP | 0814144 | 12/1997 | |
| EP | 0834540 | 8/1998 | |
| EP | 867497 | 9/1998 | |
| EP | 909582 | 4/1999 | |
| EP | 968256 | 1/2000 | |
| EP | 1146107 | 10/2001 | |
| EP | 1170355 | 1/2002 | |
| NL | 8700587 | 10/1988 | |
| WO | 0031215 | 6/2000 | |
| WO | 0164763 | 9/2001 | |
| WO | 03054115 | 7/2003 | |
| WO | 2006020547 | 2/2006 | |
| WO | WO2006020547 | 2/2006 | ............. C10G 11/18 |

OTHER PUBLICATIONS

Seydoux, Jean et al, "A Deep Resistivity Logging-While-Drilling Device for Proactive Geosteering", The Leading Edge, Jun. 2004, pp. 581-586.

Meier, W. M. et al., "Atlas of Zeolite Structure Types," Zeolites, 3rd Edition, 1992. p. 453.

Catalysis by Crystalline Aluminosilicates: Characterization of Intermediate Pore-Size Zeolites by the "Constraint Index", Journal of Catalysis, 1991, vol. 67, pp. 218-222.

Meier, W. M. et al., "Atlas of Zeolite Structure Types," Zeolites, 4rd Revised Edition, vol. 17:1, 1996. p. 230.

* cited by examiner

SYSTEMS AND METHODS FOR MAKING A MIDDLE DISTILLATE PRODUCT AND LOWER OLEFINS FROM A HYDROCARBON FEEDSTOCK

PRIORITY CLAIM

The present application claims priority of U.S. Provisional Application No. 60/911,715 filed 13 Apr. 2007.

FIELD OF THE INVENTION

The present disclosure relates to systems and methods for making a middle distillate product and lower olefins from a hydrocarbon feedstock.

BACKGROUND OF THE INVENTION

The fluidized catalytic cracking (FCC) of heavy hydrocarbons to produce lower boiling hydrocarbon products such as gasoline is well known in the art. FCC processes have been around since the 1940's. Typically, an FCC unit or process includes a riser reactor, a catalyst separator and stripper, and a regenerator. A FCC feedstock is introduced into the riser reactor wherein it is contacted with hot FCC catalyst from the regenerator. The mixture of the feedstock and FCC catalyst passes through the riser reactor and into the catalyst separator wherein the cracked product is separated from the FCC catalyst. The separated cracked product passes from the catalyst separator to a downstream separation system and the separated catalyst passes to the regenerator where the coke deposited on the FCC catalyst during the cracking reaction is burned off the catalyst to provide a regenerated catalyst. The resulting regenerated catalyst is used as the aforementioned hot FCC catalyst and is mixed with the FCC feedstock that is introduced into the riser reactor.

Many FCC processes and systems are designed so as to provide for a high conversion of the FCC feedstock to products having boiling temperatures in the gasoline boiling range. There are situations, however, when it is desirable to provide for the high conversion of the FCC feedstock to middle distillate boiling range products, as opposed to gasoline boiling range products, and to lower olefins. However, making lower olefins requires high severity and high reaction temperature reaction conditions. These conditions normally result in low middle distillate product yield and poor middle distillate product quality. It is therefore very difficult in the conventional cracking of hydrocarbons to provide simultaneously for both a high yield of lower olefins and a high yield of middle distillate products.

United States Patent Application Publication 2006/0178546 discloses a process for making middle distillate and lower olefins. The process includes catalytically cracking a gas oil feedstock within a riser reactor zone by contacting under suitable catalytic cracking conditions within the riser reactor zone the gas oil feedstock with a middle distillate selective cracking catalyst that comprises amorphous silica alumina and a zeolite to yield a cracked gas oil product and a spent cracking catalyst. The spent cracking catalyst is regenerated to yield a regenerated cracking catalyst. Within an intermediate cracking reactor such as a dense bed reactor zone and under suitable high severity cracking conditions a gasoline feedstock is contacted with the regenerated cracking catalyst to yield a cracked gasoline product and a used regenerated cracking catalyst. The used regenerated cracking catalyst is utilized as the middle distillate selective catalyst. United States Patent Application Publication 2006/0178546 is herein incorporated by reference in its entirety.

United States Patent Application Publication 2006/0178546 allows the use of a used regenerated cracking catalyst from an intermediate cracking reactor to be used as a middle distillate selective catalyst in a riser reactor zone.

There is a need in the art to provide for the use of renewable resources.

There is a further need in the art to replace petroleum feedstocks with plant and/or animal derived feedstocks.

There is a further need in the art to increase conversion of plant and/or animal derived feedstocks to middle distillate boiling range products and to lower olefins.

There is a further need in the art to simultaneously produce middle distillate and lower olefin products from a plant and/or animal derived feedstock.

SUMMARY OF THE INVENTION

In one aspect, the invention provides a system comprising a riser reactor comprising a gas oil feedstock and a first catalyst under catalytic cracking conditions to yield a riser reactor product comprising a cracked gas oil product and a first used catalyst; a intermediate reactor comprising at least a portion of the cracked gas oil product and a second catalyst under high severity conditions to yield a cracked intermediate reactor product and a second used catalyst; wherein the intermediate reactor feedstock comprises at least one of a fatty acid and a fatty acid ester.

In another aspect, the invention provides a method comprising catalytically cracking a gas oil feedstock within an FCC riser reactor zone by contacting under suitable catalytic cracking conditions within said FCC riser reactor zone said gas oil feedstock with a first catalyst to yield an FCC riser reactor product comprising a cracked gas oil product and a first used catalyst; contacting a intermediate reactor feedstock with a second catalyst within an intermediate cracking reactor operated under suitable high severity cracking conditions so as to yield a cracked intermediate reactor product, comprising at least one lower olefin compound, and a second used catalyst; separating said cracked intermediate reactor product into a lower olefin product, comprising said at least one lower olefin compound; wherein the intermediate reactor feedstock comprises at least one of a fatty acid and a fatty acid ester.

Advantages of the invention include one or more of the following:

Improved systems and methods for use of renewable resources.

Improved systems and methods to replace petroleum feedstocks with plant and/or animal derived feedstocks.

Improved systems and methods to increase conversion of plant and/or animal derived feedstocks to lower olefins.

Improved systems and methods to simultaneously produce middle distillate and lower olefin products from a plant and/or animal derived feedstock and from a gas oil feedstock.

DETAILED DESCRIPTION OF THE INVENTION

FIG. 1

Figure 1:
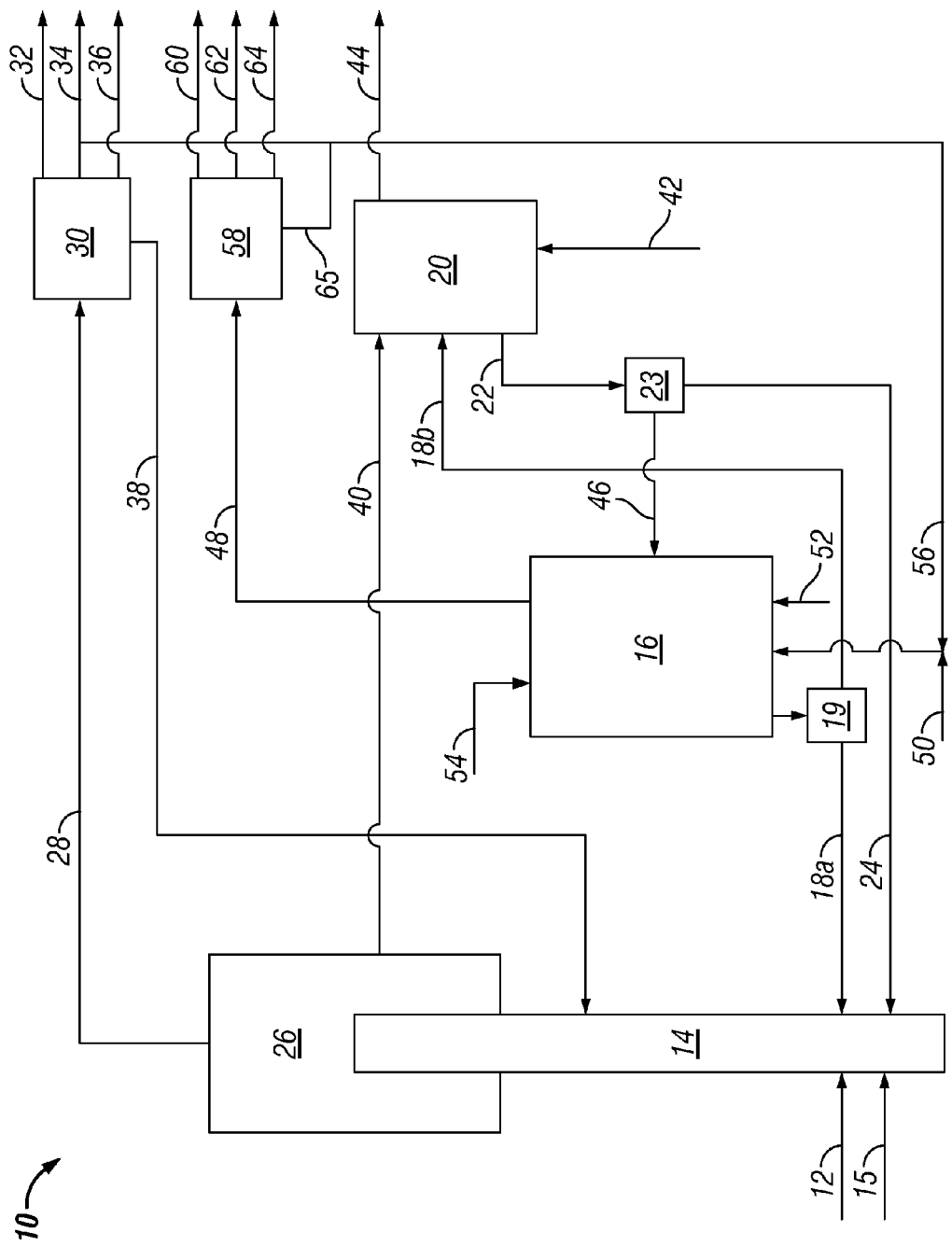
FIG. 1 illustrates a hydrocarbon feedstock conversion system.

Referring now to FIG. 1, there is illustrated a process flow schematic of system 10. Gas oil feedstock passes through conduit 12 and is introduced into the bottom of FCC riser reactor 14. FCC riser reactor 14 defines an FCC riser reactor zone, or cracking reaction zone, wherein the gas oil feedstock is mixed with a catalytic cracking catalyst. Steam may also be introduced into the bottom of FCC riser reactor 14 by way of conduit 15. This steam can serve to atomize the gas oil feedstock or as a lifting fluid. Typically, when steam is used to atomize the gas oil feedstock, the amount of steam used can be in the range of from 1 to 5 or 10 weight percent of the gas oil feedstock. The catalytic cracking catalyst can be a used regenerated cracking catalyst or a regenerated cracking catalyst, or a combination of both catalysts.

The used regenerated cracking catalyst is a regenerated cracking catalyst that has been used in intermediate reactor 16 in the high severity cracking of a gasoline feedstock. The used regenerated cracking catalyst passes from intermediate reactor 16 and is introduced into FCC riser reactor 14 by way of conduit 18a. Alternatively, used regenerated cracking catalyst may be sent to regenerator 20 through conduit 18b. Selector valve 19 may be used to determine how much used regenerated cracking catalyst is sent to conduit 18a and how much is sent to conduit 18b.

Regenerated cracking catalyst may also be mixed with the gas oil feedstock. The regenerated cracking catalyst passes from regenerator 20 through conduit 22 and is introduced by way of conduit 24 into FCC riser reactor 14 wherein it is mixed with the gas oil feedstock.

Passing through FCC riser reactor 14 that is operated under catalytic cracking conditions is a mixture of gas oil feedstock and hot catalytic cracking catalyst that forms an FCC riser reactor product comprising a mixture of a cracked gas oil product and a spent cracking catalyst. The FCC riser reactor product passes from FCC riser reactor 14 and is introduced into stripper system or separator/stripper 26.

The separator/stripper 26 can be any conventional system that defines a separation zone or stripping zone, or both, and provides means for separating the cracked gas oil product and spent cracking catalyst. The separated cracked gas oil product passes from separator/stripper 26 by way of conduit 28 to separation system 30. The separation system 30 can be any system known to those skilled in the art for recovering and separating the cracked gas oil product into the various FCC products, such as, for example, cracked gas, cracked gasoline, cracked gas oils and cycle oil. The separation system 30 may include such systems as absorbers and strippers, fractionators, compressors and separators or any combination of known systems for providing recovery and separation of the products that make up the cracked gas oil product.

The separation system 30, thus, defines a separation zone and provides means for separating the cracked gas oil product into cracked products. The cracked gas, cracked gasoline and cracked gas oils respectively pass from separation system 30 through conduits 32, 34, and 36. The cycle oil passes from separation system 30 through conduit 38 and is introduced into FCC riser reactor 14. The separated spent cracking catalyst passes from separator/stripper 26 through conduit 40 and is introduced into regenerator 20. Regenerator 20 defines a regeneration zone and provides means for contacting the spent cracking catalyst with an oxygen-containing gas, such as air, under carbon burning conditions to remove carbon from the spent cracking catalyst. The oxygen-containing gas is introduced into regenerator 20 through conduit 42 and the combustion gases pass from regenerator 20 by way of conduit 44.

The regenerated cracking catalyst passes from regenerator 20 through conduit 22. The stream of regenerated cracking catalyst passing through conduit 22 may be divided into two streams with at least a portion of the regenerated catalyst passing from regenerator 20 through conduit 22 passing through conduit 46 to the intermediate reactor 16 and with the remaining portion of the regenerated catalyst passing from regenerator 20 passing through conduit 24 to FCC riser reactor 14. To assist in the control of the cracking conditions in the FCC riser reactor 14, the split between the at least a portion of regenerated cracking catalyst passing through conduit 46 and the remaining portion of regenerated cracking catalyst passing through conduit 24 can be adjusted as required with selector valve 23.

Intermediate reactor 16 may define a dense bed fluidization zone and provides means for contacting a gasoline feedstock with the regenerated cracking catalyst contained within the intermediate reactor 16. The fluidization zone may be operated under high severity cracking conditions so as to preferentially crack the gasoline feedstock to lower olefin compounds, such as ethylene, propylene, and butylenes, and to yield a cracked gasoline product. The cracked gasoline product passes from intermediate reactor 16 through conduit 48.

Alternatively, intermediate reactor 16 may be a fast fluidized bed or riser reactor, as are known in the art.

The used regenerated cracking catalyst may pass from intermediate reactor 16 through selector valve 19 and conduit 18a and is introduced into FCC riser reactor 14, and/or used regenerated cracking catalyst may pass from intermediate reactor 16 through selector valve 19 and conduit 18b and is introduced into regenerator 20. The gasoline feedstock is introduced into the intermediate reactor 16 through conduits 50 and/or 56 and steam may be introduced into the intermediate reactor 16 by way of conduit 52. The gasoline feedstock and steam are introduced into the intermediate reactor 16 so as to provide for a fluidized bed of the regenerated catalyst. A ZSM-5 additive may be added to the regenerated catalyst of the dense phase reactor 16 or introduced into the intermediate reactor 16 through conduit 54.

A portion, or the entire amount, of the cracked gasoline passing from separation system 30 through conduit 34 may be recycled and introduced into the intermediate reactor 16 by way of conduit 56. This recycling of the cracked gasoline product can provide for an additional conversion across the overall process system of the gas oil feedstock to lower olefins. The cracked gasoline product of conduit 48 passes to olefin separation system 58. The olefin separation system 58 can be any system known to those skilled in the art for recovering and separating the cracked gasoline product into lower olefin product streams. The olefin separation system 58 may include such systems as absorbers and strippers, fractionators, compressors and separators or any combination of known systems or equipment providing for the recovery and separation of the lower olefin products from a cracked gasoline product. Yielded from the separation system 58 may be an ethylene product stream, propylene product stream, and butylenes product stream each of which respectively pass from the olefin separation system 58 though conduits 60, 62, and 64. Separation system 58 may also yield a cracked gasoline stream 65, which may be sent to recycle conduit 56. Not shown in FIG. 1 is the one or more olefin manufacturing systems to which any of the lower olefin products may be passed as a polymerization feedstock to be used in the manufacture of a polyolefin.

With system 10, all of the used regenerated cracking catalyst from intermediate reactor 16 may be sent to regenerator 20 through conduit 18b, so that FCC riser reactor 14 can be operated with 100% regenerated cracking catalyst from regenerator 20 through conduit 24. Alternatively, all of the used regenerated cracking catalyst from intermediate reactor 16 may be sent to FCC riser reactor 14 through conduit 18a, so that FCC riser reactor 14 can be operated with up to 100% used regenerated catalyst from intermediate reactor 16 through conduit 18a. Alternatively, a portion of the used regenerated cracking catalyst from intermediate reactor 16 may be sent to regenerator 20 through conduit 18b and a portion of the used regenerated cracking catalyst may be sent to FCC riser reactor 14 through conduit 18a, so that FCC riser reactor 14 can be operated with a customized mixture of the regenerated cracking catalyst and the used regenerated cracking catalyst, to achieve the desired process conditions.

FIG. 2

Figure 2:
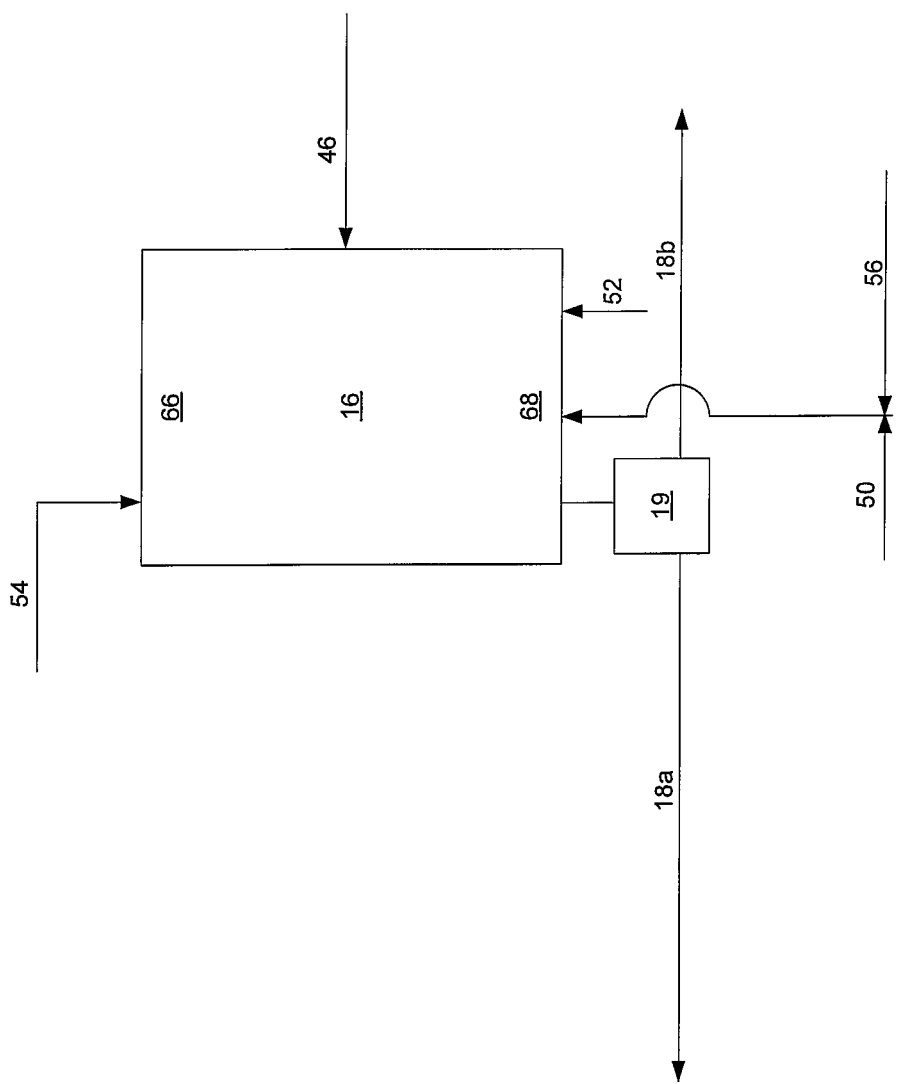
FIG. 2 illustrates an intermediate cracking reactor.

FIG. 2 illustrates in somewhat greater detail the intermediate reactor 16. Intermediate reactor 16 is a vessel that defines an intermediate reaction zone 66 and a stripping zone 68. Regenerated catalyst is introduced into the intermediate reaction zone 66 by way of conduit 46, gasoline feedstock is introduced into the intermediate reaction zone 66 by way of conduits 50 and/or 56, and ZSM-5 additive is introduced into the intermediate reaction zone 66 by way of conduit 54. Steam may be introduced into the stripping zone 68 by way of conduit 52 and used regenerated cracking catalyst is withdrawn from the stripping zone 68 by way of conduits 18a and/or 18b.

The systems and methods of the invention provide for the processing of a heavy hydrocarbon feedstock to selectively produce middle distillate boiling range products and lower olefins. It has been discovered that the use of an intermediate cracking reactor, which can include reactors of the type such as a dense phase reactor, or fixed fluidized bed reactor, or a riser reactor, between the catalyst regenerator and an FCC riser reactor of a conventional FCC process or unit can provide for an improved middle distillate yield and for enhanced selectivity toward the production of lower olefins.

The invention may utilize the intermediate cracking reactor to provide for the cracking of a intermediate reactor feedstock that preferably boils in the gasoline temperature range to yield lower olefins and for the conditioning of the catalyst so that when it is used in the cracking of the FCC feedstock in the FCC riser reactor the reactor conditions are more suitable for the production of a middle distillate product.

An additional feature of the invention is that it can further include a system integrated into the process to provide for the processing of the lower olefins yielded from the intermediate cracking reactor. This olefin processing system can perform such functions as the separation of the lower olefins into specific olefin product streams, such as an ethylene product stream, a propylene product stream or a butylenes product stream or any combination thereof, and the use of the lower olefins as a polymerization feed in the manufacture of polyolefins.

A gas oil feedstock may be introduced into the bottom of an FCC riser reactor where it is mixed with hot cracking catalyst such as a regenerated cracking catalyst or a used regenerated cracking catalyst or a combination of both catalysts. The starting catalytic cracking catalyst used and regenerated to ultimately become the regenerated cracking catalyst can be any suitable cracking catalyst known in the art to have cracking activity at the elevated temperatures contemplated by the invention.

Catalysts

Preferred catalytic cracking catalysts include fluidizable cracking catalysts comprised of a molecular sieve having cracking activity dispersed in a porous, inorganic refractory oxide matrix or binder. The term "molecular sieve" as used herein refers to any material capable of separating atoms or molecules based on their respective dimensions. Molecular sieves suitable for use as a component of the cracking catalyst include pillared clays, delaminated clays, and crystalline aluminosilicates. Normally, it is preferred to use a cracking catalyst that contains a crystalline aluminosilicate. Examples of such aluminosilicates include Y zeolites, ultrastable Y zeolites, X zeolites, zeolite beta, zeolite L, offretite, mordenite, faujasite, and zeolite omega. Suitable crystalline aluminosilicates for use in the cracking catalyst are X and Y zeolites, for example Y zeolites.

U.S. Pat. No. 3,130,007, the disclosure of which is hereby incorporated by reference in its entirety, describes Y-type zeolites having an overall silica-to-alumina mole ratio between about 3.0 and about 6.0, with a typical Y zeolite having an overall silica-to-alumina mole ratio of about 5.0. It is also known that Y-type zeolites can be produced, normally by dealumination, having an overall silica-to-alumina mole ratio above about 6.0.

The stability and/or acidity of a zeolite used as a component of the cracking catalyst may be increased by exchanging the zeolite with hydrogen ions, ammonium ions, polyvalent metal cations, such as rare earth-containing cations, magnesium cations or calcium cations, or a combination of hydrogen ions, ammonium ions and polyvalent metal cations, thereby lowering the sodium content until it is less than about 0.8 weight percent, preferably less than about 0.5 weight percent and or less than about 0.3 weight percent, calculated as $Na_2O$. Methods of carrying out the ion exchange are known in the art.

The zeolite or other molecular sieve component of the cracking catalyst is combined with a porous, inorganic refractory oxide matrix or binder to form a finished catalyst prior to use. The refractory oxide component in the finished catalyst may be silica-alumina, silica, alumina, natural or synthetic clays, pillared or delaminated clays, mixtures of one or more of these components and the like. The inorganic refractory oxide matrix may comprise a mixture of silica-alumina and a clay such as kaolin, hectorite, sepiolite and attapulgite. A finished catalyst may contain between about 5 weight percent to about 40 weight percent zeolite or other molecular sieve and greater than about 20 weight percent inorganic, refractory oxide. In general, the finished catalyst may contain between about 10 to about 35 weight percent zeolite or other molecular sieve, between about 10 to about 30 weight percent inorganic, refractory oxide, and between about 30 to about 70 weight percent clay.

The crystalline aluminosilicate or other molecular sieve component of the cracking catalyst may be combined with the porous, inorganic refractory oxide component or a precursor thereof by any suitable technique known in the art including mixing, mulling, blending or homogenization. Examples of precursors that may be used include alumina, alumina sols, silica sols, zirconia, alumina hydrogels, polyoxycations of aluminum and zirconium, and peptized alumina. In one suitable method of preparing the cracking catalyst, the zeolite is combined with an alumina-silicate gel or sol or other inorganic, refractory oxide component, and the resultant mixture is spray dried to produce finished catalyst particles normally ranging in diameter between about 40 and about 80 microns. If desired, however, the zeolite or other molecular sieve may be mulled or otherwise mixed with the refractory oxide component or precursor thereof, extruded and then ground into the desired particle size range. Normally, the finished catalyst will have an average bulk density between about 0.30 and about 0.90 gram per cubic centimeter and a pore volume between about 0.10 and about 0.90 cubic centimeter per gram.

When the process is operated in the middle distillate selective mode (or diesel mode) of operation, a middle distillate selective cracking catalyst may be used. A middle distillate selective cracking catalyst is similar to the above-described preferred cracking catalyst in that it comprises a molecular sieve dispersed in a porous, inorganic refractory oxide binder, but it has some significant differences over the typical cracking catalyst, which such differences are hereafter described in more detail. The middle distillate cracking catalyst may exhibit catalytic properties that provide for the selective cracking of a gas oil feedstock to yield a cracked gas oil product that preferentially includes middle distillate boiling range products such as those in the diesel boiling range, such as from 230° C. to 350° C.

The middle distillate selective cracking catalyst may comprise zeolite or other molecular sieve component, an alumina component and an additional porous, inorganic refractory matrix or binder component. The middle distillate selective cracking catalyst can be prepared by any method known to those skilled in the art that provide for a catalytic cracking catalyst having the desired composition. More specifically, the middle distillate selective cracking catalyst can comprise alumina in the amount in the range of from 40 wt. % to 65 wt. %, for example from 45 wt. % to 62 wt. %, or from 50 wt. % to 58 wt. %, with the weight percent being based on the total weight of the middle distillate selective cracking catalyst, a porous inorganic refractory oxide matrix component providing a matrix surface area, and a zeolite or other molecular sieve component providing a zeolitic surface area. The alumina component of the middle distillate selective cracking catalyst can be any suitable type of alumina and from any suitable source. Examples of suitable types of aluminas are those as disclosed in U.S. Pat. No. 5,547,564 and U.S. Pat. No. 5,168,086, which are herein incorporated by reference in their entirety, and include, for example, alpha alumina, gamma alumina, theta alumina, eta alumina, bayerite, pseudoboehmite and gibbsite.

The matrix surface area within the middle distillate selective cracking catalyst that is provided by the porous inorganic refractory oxide matrix component may be in the range of from 20 to 90 square meters per gram of middle distillate selective cracking catalyst. The zeolitic surface area within the middle distillate selective cracking catalyst that is provided by the zeolite or other molecular sieve component may be less than 140 square meters per gram.

In order for the middle distillate selective cracking catalyst to have the desired catalytic property of preferentially providing for the yield of middle distillate such as diesel, the portion of the surface area of the middle distillate selective cracking catalyst that is contributed by the zeolite or other molecular sieve component, i.e. the zeolitic surface area, may be less than 130 square meters per gram, for example less than 110 square meters per gram, or, less than 100 square meters per gram. The zeolite or other molecular sieve component of the middle distillate selective cracking catalyst are those aluminosilicates selected from the group consisting of Y zeolites, ultrastable Y zeolites, X zeolites, zeolite beta, zeolite L, offretite, mordenite, faujasite, and zeolite omega.

The zeolitic surface area within the middle distillate selective cracking catalyst may be as low as 20 square meters per gram, but, generally, the lower limit is greater than 40 square meters per gram. The lower limit for the zeolitic surface area within the middle distillate selective cracking catalyst may exceed 60 square meters per gram, or, the zeolitic surface area may exceed 80 square meters per gram. Thus, for example, the portion of the surface area of the middle distillate selective cracking catalyst contributed by the zeolite or other molecular sieve component, i.e. the zeolitic surface area, can be in the range of from 20 square meters per gram to 140 square meters per gram, or in the range of from 40 square meters per gram to 130 square meters per gram.

The ratio of the zeolitic surface area to the matrix surface area within the middle distillate cracking catalyst is a property thereof which is important in providing for a catalyst having the desired cracking properties. The ratio of zeolitic surface area to matrix surface area, thus, may be in the range of from 1:1 to 2:1, for example, from 1.1:1 to 1.9:1, or, from 1.2:1 to 1.7:1. Considering these ratios, the portion of the surface area of the middle distillate selective cracking catalyst contributed by the porous inorganic refractory oxide matrix component, i.e., the matrix surface area, is generally in the range of from 20 square meters per gram to 80 square meters per gram. One suitable range for the matrix surface area is from 40 square meters per gram to 75 square meters per gram, or, the range is from 60 square meters per gram to 70 square meters per gram.

One method by which the process conditions within the FCC riser reactor may be controlled and a desired product mix is provided is through the addition of a ZSM-5 additive into the intermediate cracking reactor, as opposed to its addition into the FCC riser reactor. The ZSM-5 additive may be introduced into the intermediate cracking reactor, in particular, when a dense phase reactor is used, into the dense phase reaction zone thereof, along or concurrently with the regenerated catalyst that is a middle distillate selective cracking catalyst. When a ZSM-5 additive is used along with the middle distillate selective cracking catalyst in the intermediate cracking reactor, an improvement in the yield of the lower olefins such as propylene and butylenes can be achieved. Thus, it is desirable to introduce into the intermediate cracking reactor, particularly when the regenerated catalyst that is being introduced therein is a middle distillate selective cracking catalyst, ZSM-5 additive in an amount upwardly to 30 weight percent, for example upwardly to 20 weight percent, or upwardly to 18 weight percent, of the regenerated catalyst being introduced into the intermediate cracking reactor. Thus, when ZSM-5 additive is introduced into the intermediate cracking reactor, the amount may be in the range of from 1 to 30 weight percent of the regenerated cracking catalyst being introduced into the intermediate cracking reactor, for example from 3 to 20 weight percent, or, from 5 to 18 weight percent.

The ZSM-5 additive is a molecular sieve additive selected from the family of medium pore size crystalline aluminosilicates or zeolites. Molecular sieves that can be used as the ZSM-5 additive include medium pore zeolites as described in "Atlas of Zeolite Structure Types," Eds. W. H. Meier and D. H. Olson, Butterworth-Heineman, Third Edition, 1992, which is hereby incorporated by reference in its entirety. The medium pore size zeolites generally have a pore size from about 0.5 nm, to about 0.7 nm and include, for example, MFI, MFS, MEL, MTW, EUO, MTT, HEU, FER, and TON structure type zeolites (IUPAC Commission of Zeolite Nomenclature). Non-limiting examples of such medium pore size zeolites, include ZSM-5, ZSM-12, ZSM-22, ZSM-23, ZSM-34, ZSM-35, ZSM-38, ZSM-48, ZSM-50, silicalite, and silicalite 2. One suitable zeolite is ZSM-5, which is described in U.S. Pat. Nos. 3,702,886 and 3,770,614, which are herein incorporated by reference in their entirety.

ZSM-11 is described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. Other suitable molecular sieves include the silicoaluminophosphates (SAPO), such as SAPO-4 and SAPO-11 which is described in U.S. Pat. No. 4,440,871; chromosilicates; gallium silicates, iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651; and iron aluminosilicates. All of the above patents are incorporated herein by reference in their entirety.

The ZSM-5 additive may be held together with a catalytically inactive inorganic oxide matrix component, in accordance with conventional methods.

U.S. Pat. No. 4,368,114 describes in detail the class of zeolites that can be suitable ZSM-5 additives, and such patent is incorporated herein by reference.

System Operations and Conditions

In the case of the use of an FCC riser reactor that is vertically arranged, lift gas or lift steam may also be introduced into the bottom of the FCC riser reactor along with the gas oil feedstock and the hot cracking catalyst. The regenerated cracking catalyst that is yielded from the catalyst regenerator has a higher temperature than the used regenerated cracking catalyst that is yielded from the intermediate cracking reactor. Also, the used regenerated cracking catalyst has deposited thereon as a result of its use in the intermediate cracking reactor a certain amount of coke. A particular catalyst or combination of catalysts may be used to help control the conditions within the FCC riser reactor to provide for certain desired cracking conditions required to provide a desired product or mix of products.

The mixture of gas oil feedstock and hot cracking catalyst, and, optionally, lift gas or steam, passes through the FCC riser reactor wherein cracking takes place. The FCC riser reactor defines a catalytic cracking zone and provides means for providing a contacting time to allow the cracking reactions to occur. The average residence time of the hydrocarbons in the FCC riser reactor generally can be in the range of upwardly to about 5 to 10 seconds, but usually is in the range of from 0.1 to 5 seconds. The weight ratio of catalyst to hydrocarbon feed (catalyst/oil ratio) generally can be in the range of from about 2 to about 100 and even as high as 150. More typically, the catalyst-to-oil ratio can be in the range of from 5 to 100. When steam is introduced into the FCC riser reactor with the gas oil feedstock, the steam-to-oil weight ratio can be in the range of from 0.01 to 5, and, more, typically, it is in the range of from 0.05 to 1.5.

The temperature in the FCC riser reactor generally can be in the range of from about 400° C. to about 600° C. More typically, the FCC riser reactor temperature can be in the range of from 450° C. to 550° C. The FCC riser reactor temperatures may tend to be lower than those of typical conventional fluidized catalytic cracking processes; because, the inventive process is to provide for a high yield of middle distillates as opposed to the production of gasoline as is often sought with conventional fluidized catalytic cracking processes. The control of certain of the process conditions within the FCC riser reactor may be controlled by adjusting the ratio of regenerated cracking catalyst from the catalyst regenerator to used regenerated cracking catalyst from the intermediate cracking reactor that is introduced into the bottom of the FCC riser reactor.

The mixture of hydrocarbons and catalyst from the FCC riser reactor pass as an FCC riser reactor product comprising cracked gas oil product and spent cracking catalyst to a stripper system that provides means for separating hydrocarbons from catalyst and defines a stripper separation zone wherein the cracked gas oil product is separated from the spent cracking catalyst. The stripper system can be any system or means known to those skilled in the art for separating FCC catalyst from a hydrocarbon product. In a typical stripper operation, the FCC riser reactor product, which is a mixture of cracked gas oil product and spent cracking catalyst passes to the stripper system that includes cyclones for separating the spent cracking catalyst from the vaporous cracked gas oil product. The separated spent cracking catalyst enters the stripper vessel from the cyclones where it is contacted with steam to further remove cracked gas oil product from the spent cracking catalyst. The coke content on the separated spent cracking catalyst is, generally, in the range of from about 0.5 to about 5 weight percent (wt. %), based on the total weight of the catalyst and the carbon. Typically, the coke content on the separated spent cracking catalyst is in the range of from or about 0.5 wt. % to or about 1.5 wt. %.

The separated spent cracking catalyst is then passed to a catalyst regenerator that provides means for regenerating the separated spent cracking catalyst and defines a regeneration zone into which the separated spent cracking catalyst is introduced and wherein carbon that is deposited on the separated spent cracking catalyst is burned in order to remove the carbon to provide a regenerated cracking catalyst having a reduced carbon content. The catalyst regenerator typically is a vertical cylindrical vessel that defines the regeneration zone and wherein the spent cracking catalyst is maintained as a fluidized bed by the upward passage of an oxygen-containing regeneration gas, such as air.

The temperature within the regeneration zone is, in general, maintained in the range of from about 621° C. to 760° C., and more, typically, in the range of from 677° C. to 715° C. The pressure within the regeneration zone typically is in the range of from about atmospheric to about 345 kPa, for example from about 34 to 345 kPa. The residence time of the separated spent cracking catalyst within the regeneration zone is in the range of from about 1 to about 6 minutes, and, typically, from about 2 to about 4 minutes. The coke content on the regenerated cracking catalyst is less than the coke content on the separated spent cracking catalyst and, generally, is less than 0.5 wt. %, with the weight percent being based on the weight of the regenerated cracking catalyst excluding the weight of the coke content. The coke content of the regenerated cracking catalyst will, thus, generally, be in the range of from about 0.01 wt. % to or about 0.5 wt. %, for example the coke concentration on the regenerated cracking catalyst may be less than 0.3 wt. %, or less than 0.1 wt. %.

The regenerated cracking catalyst from the catalyst regenerator is passed to the intermediate cracking reactor, which can be as noted above a dense phase reactor, or a fixed fluidized bed reactor, or a riser reactor, that provides means for contacting a gasoline feedstock with the regenerated cracking catalyst and which defines a reaction or cracking zone wherein the gasoline feedstock is contacted with the regenerated cracking catalyst under suitable high severity cracking conditions, either with or without the presence of steam.

The type of intermediate cracking reactor may be a dense phase reactor, a fast fluidized bed reactor, or a riser reactor. The dense phase reactor can be a vessel that defines two zones, including an intermediate reaction or cracking or dense phase reaction zone, and a stripping zone. Contained within the intermediate reaction zone of the vessel is regenerated cracking catalyst that is fluidized by the introduction of the gasoline feedstock and, optionally, steam, which is introduced into the stripping zone.

One suitable dense phase reactor design includes a dense phase reactor vessel that defines the intermediate reaction zone and the stripping zone that are in fluid communication with each other with the stripping zone located below the intermediate reaction zone. To provide for a high steam velocity within the stripping zone, as compared to its velocity within the intermediate reaction zone, the cross sectional area of the stripping zone may be less than the cross sectional area of the intermediate reaction zone. The ratio of the stripping zone cross sectional area to the intermediate reaction zone cross sectional area can be in the range of from 0.1:1 to 0.9:1, for example from 0.2:1 to 0.8:1, or, from 0.3:1 to 0.7:1.

The geometry of the dense phase reactor vessel may be such that it is generally cylindrical in shape. The length-to-diameter ratio of the stripping zone is such as to provide for the desired high steam velocity within the stripping zone and to provide enough contact time within the stripping zone for the desired stripping of the used regenerated catalyst that is to be removed from the dense phase reactor vessel. Thus, the length-to-diameter dimension of the stripping zone can be in the range of from 1:1 to 25:1, for example, from 2:1 to 15:1, or, from 3:1 to 10:1.

The dense phase reactor vessel may be equipped with a catalyst introduction conduit that provides regenerated catalyst introduction means for introducing the regenerated cracking catalyst from the catalyst regenerator into the intermediate reaction zone of the dense phase reactor vessel. The dense phase reactor vessel is further equipped with a used regenerated catalyst withdrawal conduit that provides used regenerated catalyst withdrawal means for withdrawing used regenerated catalyst from the stripping zone of the dense phase reactor vessel. The gasoline feedstock is introduced into the intermediate reaction zone by way of a feed introduction conduit providing means for introducing a gasoline feedstock into the intermediate zone of the dense phase reactor, and the steam is introduced into the stripping zone by way of a steam introduction conduit providing means for introducing steam into the stripping zone of the dense phase reactor. The cracked gasoline product is withdrawn from the intermediate reaction zone by way of a product withdrawal conduit providing means for withdrawing a cracked gasoline product from the intermediate zone of the dense phase reactor.

The intermediate cracking reactor can be operated or controlled independently from the operation or control of the FCC riser reactor. This independent operation or control of the intermediate cracking reactor provides the benefit of an improved overall, i.e., across the entire process system including the FCC riser reactor as well as the intermediate cracking reactor, conversion of the gas oil feedstock into the desired end-products of middle distillate and the lower olefins of ethylene, propylene and butylenes. With the independent operation of the intermediate cracking reactor, the severity of the FCC riser reactor cracking conditions can be reduced to thereby provide for a higher yield of middle distillate or other desired products in the gas oil reactor product, and the severity of the intermediate cracking reactor can be controlled to optimize the yield of lower olefins or other desired products.

One way of controlling the operation of the intermediate cracking reactor is by the introduction of steam along with the gasoline feedstock into the intermediate cracking reactor. Thus, the dense phase reaction zone is operated under such reaction conditions as to provide for a cracked gasoline product and, for example, to provide for a high cracking yield of lower olefins. The high severity cracking conditions can include a temperature within the dense phase or intermediate reaction zone that is in the range from about 482° C. to about 871° C., for example, the temperature is in the range of from 510° C. to 871° C., or, from 538° C. to 732° C. The pressure within the intermediate reaction zone can be in the range of from about atmospheric to about 345 kPa, for example, from about 34 to 345 kPa.

Steam may be introduced into the stripping zone of the intermediate cracking reactor and to be contacted with the regenerated cracking catalyst contained therein and in the intermediate reaction zone. The use of steam in this manner provides, for a given gas oil conversion across the system, an increase in the propylene yield and butylene yield. It has generally been understood by those skilled in the art that in conventional gas oil reactor cracking processes low severity gas oil reactor cracking conditions result in less lower olefins yield relative to high severity gas oil reactor cracking conditions. The use of steam in the intermediate cracking reactor may provide further enhancements in the yield of lower olefins therefrom.

The use of the steam is particularly desirable; because, for a given gas oil conversion across the process system, and in the cracking of the gasoline feedstock in the intermediate cracking reactor, it can provide for an improved selectivity toward lower olefin yield with an increase in propylene and butylenes yield. Thus, when steam is used, the weight ratio of steam to gasoline feedstock introduced into the intermediate cracking reactor, with gasoline being introduced into the reaction zone and steam being introduced into the stripping zone, can be in the range of upwardly to or about 15:1, for example, the range may be from 0.1:1 to 10:1, or, the weight ratio of steam to gasoline feedstock may be in the range of from 0.2:1 to 9:1, or, from 0.5:1 to 8:1.

Used regenerated cracking catalyst is removed from the intermediate cracking reactor and utilized as hot cracking catalyst mixed with the gas oil feedstock that is introduced into the FCC riser reactor and/or sent to the regenerator to be regenerated. One aspect of using the used regenerated cracking catalyst in the FCC riser reactor is that it provides for the partial deactivation of the regenerated catalyst prior to its use as hot cracking catalyst in the FCC riser reactor. What is meant by partial deactivation is that the used regenerated cracking catalyst will contain a slightly higher concentration of carbon than the concentration of carbon that is on the regenerated cracking catalyst. This partial deactivation of the regenerated cracking catalyst may provide for a preferred product yield when the gas oil feedstock is cracked within the riser reactor zone. The coke concentration on the used regenerated cracking catalyst is greater than the coke concentration on the regenerated cracking catalyst, but it is less than that of the separated spent cracking catalyst. The coke content of the used regenerated catalyst can be greater than 0.1 wt. % and even greater than 0.5 wt. %. For example, the coke content of the used regenerated catalyst may be in the range of from about 0.1 wt. % to about 1 wt. %, or from 0.1 wt. % to 0.6 wt. %.

Another benefit provided by the use of the intermediate cracking reactor is associated with the used regenerated cracking catalyst having a temperature that is lower than the temperature of the regenerated cracking catalyst. This lower temperature of the used regenerated cracking catalyst in combination with the partial deactivation, as discussed above, may provide further benefits in a preferential product yield from the cracking of the gas oil feedstock.

To assist in providing for the control of the process conditions within the FCC riser reactor and to provide for a desired product mix, the regenerated cracking catalyst can be divided into at least a portion that is passed to the intermediate cracking reactor and a remaining portion of the regenerated cracking catalyst that is mixed with the gas oil feedstock to be introduced into the FCC riser reactor. The at least a portion of the regenerated cracking catalyst introduced into the intermediate cracking reactor can be in the range of upwardly to 100 percent (%) of the regenerated cracking catalyst yielded from the catalyst regenerator depending upon the requirements of the process and the desired product yields. Specifically, however, the at least a portion of regenerated cracking catalyst will represent from about 10% to 100% of the separated regenerated catalyst withdrawn from the catalyst regenerator. Also, the at least a portion of regenerated cracking catalyst can be from about 30% to about 90%, or from 50% to 95% of the separated regenerated catalyst that is withdrawn from the catalyst regenerator.

In controlling the reaction conditions within the FCC riser reactor, as already noted, a combination or mixture of used regenerated cracking catalyst from the intermediate cracking reactor and the regenerated cracking catalyst from the catalyst regenerator is introduced into the FCC riser reactor with the gas oil feedstock. The relative amount of the used regenerated cracking catalyst to the regenerated cracking catalyst is adjusted so as to provide for the desired gas oil cracking conditions within the FCC riser reactor zone; but, generally, the weight ratio of the used regenerated cracking catalyst to the regenerated cracking catalyst is in the range of from 0.1:1 to 100:1, for example, from 0.5:1 to 20:1, or, from 1:1 to 10:1. For a system operated at steady state, the weight ratio of used regenerated cracking catalyst-to-regenerated cracking catalyst approximates the weight ratio of the at least a portion of regenerated cracking catalyst passing to the intermediate cracking reactor to the remaining portion of regenerated cracking catalyst that is mixed with the gas oil feedstock introduced into the FCC riser reactor, and, thus, the aforementioned ranges are also applicable to such weight ratio.

It is notable that it is not a desired aspect of the inventive process to introduce spent cracking catalyst into the intermediate cracking reactor for a variety of reasons. For instance, the spent cracking catalyst has much higher carbon content than the regenerated cracking catalyst and, thus, its activity does not favor the yielding of the more desirable lower olefins. The regenerated cracking catalyst introduced into the intermediate cracking reactor to be more than 50 weight percent of the sum weight of the regenerated cracking catalyst and spent cracking catalyst that is introduced into the intermediated cracking reactor. The amount of spent cracking catalyst introduced into the intermediate cracking reactor may be minimized and may be less than 20 weight percent of the sum weight of the regenerated cracking catalyst and spent cracking catalyst that is introduced into the intermediate cracking reactor, for example, less than 10 weight percent, or, less than 5 weight percent.

The combination of one or more of the above described process variables and operating conditions allows for the control of the conversion of the gas oil feedstock. Generally, it is desired for the gas oil feedstock conversion to be in the range of from 30 to 90 weight percent, for example, from 40 to 90 weight percent. What is meant by gas oil feedstock conversion is the weight amount of hydrocarbons contained in the gas oil feedstock that has a boiling temperature greater than 221° C. that is converted in the FCC riser reactor to hydrocarbons having a boiling temperature less than 221° C. divided by the weight amount of hydrocarbons contained in the gas oil feedstock having a boiling temperature greater than 221° C. As earlier noted, the process may be operated so as to provide for the preferential or selective yielding of middle distillate boiling range products and lower olefins.

Gas Oil Feedstock Mixtures

The gas oil feedstock may have two or more portions. The first portion of the gas oil feedstock charged to the process may be any heavy hydrocarbon feedstock that may be or is typically charged to a fluidized catalytic cracking unit that boil in the boiling range of from 200° C. to 800° C., including, for example, gas oils, resid, or other hydrocarbons. In general terms, hydrocarbon mixtures boiling in the range of from 345° C. to 760° C. can make particularly suitable feedstock first portions. Examples of the types of refinery feed streams that can make suitable gas oil feedstock first portions include vacuum gas oils, coker gas oil, straight-run residues, thermally cracked oils and other hydrocarbon streams.

The second portion of the gas oil feedstock charged to the process may be any fatty acids or fatty acid esters, such as glyceryl esters of a fatty acid, for example mono-glycerides, di-glycerides, and/or tri-glycerides. Suitable fatty acids or fatty acid esters may have from about 8 to about 30 carbon atoms, for example from about 10 to about 28 carbon atoms, or from about 12 to about 25 carbon atoms.

The percentage of the first portion may be from about 60 to about 99 percent, for example from about 70 to about 95 percent, or from about 80 to about 90 percent, with the balance being the second portion, and optionally other feedstock portions.

The percentage of the second portion may be from about 1 to about 40 percent, for example from about 5 to about 30 percent, or from about 10 to about 20 percent, with the balance being the first portion, and optionally other feedstock portions.

Intermediate Reactor Feedstock Mixtures

The intermediate reactor feedstock may have two or more portions. The first portion of the intermediate reactor feedstock charged to the dense phase reaction zone may be any suitable hydrocarbon feedstock having a boiling temperature that is in the gasoline boiling temperature range. Generally, the intermediate reactor feedstock first portion comprises hydrocarbons boiling in the temperature range of from about 32° C. to about 204° C. Examples of refinery streams that may be used as the intermediate reactor feedstock first portion include straight run gasolines, naphthas, catalytically cracked gasolines, and coker naphthas.

The second portion of the intermediate reactor feedstock charged to the process may be any fatty acids or fatty acid esters, such as glyceryl esters of a fatty acid, for example mono-glycerides, di-glycerides, and/or tri-glycerides. Suitable fatty acids or fatty acid esters may have from about 4 to about 15 carbon atoms, for example from about 5 to about 12 carbon atoms, or from about 6 to about 10 carbon atoms.

The percentage of the first portion may be from about 60 to about 99 percent, for example from about 70 to about 95 percent, or from about 80 to about 90 percent, with the balance being the second portion, and optionally other feedstock portions.

The percentage of the second portion may be from about 1 to about 40 percent, for example from about 5 to about 30 percent, or from about 10 to about 20 percent, with the balance being the first portion, and optionally other feedstock portions.

Fatty Acids and Fatty Acid Esters

Suitable fatty acids or fatty acid esters include glyceryl esters of a fatty acid, for example mono-glycerides, di-glycerides, and/or tri-glycerides.

The oils and fats that are being used may be triglycerides. These compounds are esters of glycerol with fatty acids wherein the fatty acid moiety may range from about 4 to about 30 carbon atoms, the fatty acids most commonly being saturated or containing 1, 2 or 3 double bonds. The fatty acids have from about 10 to about 25 carbon atoms, for example from about 14 to about 20. Suitable triglycerides are the glycerol esters of C14-C18 carboxylic acids, e.g., palmitic acid, stearic acid, oleic acid, linoleic acid or linolenic acid. The triglycerides do not need to be in anhydrous or pure form or be subjected to prior hydrogenation by methods known in the art. The oils may contain variable amounts of free fatty acids and/or esters both of which may also be converted to hydrocarbons during the process of this invention. The triglycerides may be composed of natural glycerides only. However, when recovered from nature they may also comprise other materials like carotenoids, hydrocarbons, phosphatides, simple fatty acids and their esters, terpenes, sterols, fatty alcohols, tocopherols, polyisoprene, carbohydrates and/or proteins. It is understood that the triglycerides may contain such materials as part of their composition. Suitable plant oils include rapeseed oil, palm oil, coconut oil, corn oil, soya oil, safflower oil, sunflower oil, linseed oil, olive oil and peanut oil. Also animal fats can be used, for example pork lard, beef fat, mutton fat and chicken fat.

The oils and fats may be used on their own or in mixtures. It is to be understood that mixtures of the oils, although of different origins, are suitable as feed to the process. Thus mixtures of the plant oils, mixtures of the animal oils, and mixtures which include plant oils and animal oils are within the scope of this invention. Natural fatty acids and esters, other than triglycerides, also may be used included in the feedstock for the process. Fatty acid methyl esters derived from trans-esterification of plant oils and animal fats may be used.

One can use the triglycerides as the sole component of the hydrocarbon feedstock in the process according to the invention, or one can use a hydrocarbon feedstock that comprises a conventional fluid catalytic cracking feedstock whereto triglycerides are added. The hydrocarbon feedstock may contain in the range from 2-30 wt % triglycerides, for example from 5-20 wt % triglycerides. The advantage of addition of triglycerides to the conventional feedstock is that the properties of the cracked products can be adjusted. For example, when a heavy conventional feedstock is used and triglycerides are added it can result in an increase of the yield of lower olefins.

Illustrative Embodiments

In one embodiment of the invention, there is disclosed a system comprising a riser reactor comprising a gas oil feedstock and a first catalyst under catalytic cracking conditions to yield a riser reactor product comprising a cracked gas oil product and a first used catalyst; a intermediate reactor comprising at least a portion of the cracked gas oil product and a second catalyst under high severity conditions to yield a cracked intermediate reactor product and a second used catalyst; wherein the intermediate reactor feedstock comprises at least one of a fatty acid and a fatty acid ester. In some embodiments, the gas oil feedstock comprises at least one of a fatty acid and a fatty acid ester. In some embodiments, the fatty acid ester comprises a triglyceride. In some embodiments, the triglyceride comprises a plant oil and/or an animal fat. In some embodiments, the system also includes a separator for separating said riser reactor product into said cracked gas oil product and said first used catalyst. In some embodiments, the system also includes a regenerator for regenerating said first used catalyst to yield a first regenerated catalyst. In some embodiments, the second catalyst comprises the first regenerated catalyst. In some embodiments, the first catalyst comprises the second used catalyst. In some embodiments, the system also includes a separation system for separating the cracked gas oil product into at least two of a cracked gas stream, a cracked gasoline stream, a cracked gas oil stream, and a cycle oil stream. In some embodiments, the system also includes a recycle conduit to send the cycle oil stream to the riser reactor. In some embodiments, the system also includes a second separation system for separating the cracked intermediate reactor product into at least two of a ethylene stream, a propylene stream, a butylene stream, and a cracked gasoline stream. In some embodiments, the system also includes a second recycle conduit to send the cracked gasoline stream to the intermediate reactor. In some embodiments, the intermediate reactor comprises a fast fluidized bed reactor, a riser reactor, or a dense bed reactor.

In one embodiment of the invention, there is disclosed a method comprising catalytically cracking a gas oil feedstock within an FCC riser reactor zone by contacting under suitable catalytic cracking conditions within said FCC riser reactor zone said gas oil feedstock with a first catalyst to yield an FCC riser reactor product comprising a cracked gas oil product and a first used catalyst; contacting a intermediate reactor feedstock with a second catalyst within an intermediate cracking reactor operated under suitable high severity cracking conditions so as to yield a cracked intermediate reactor product, comprising at least one lower olefin compound, and a second used catalyst; separating said cracked intermediate reactor product into a lower olefin product, comprising said at least one lower olefin compound; wherein the intermediate reactor feedstock comprises at least one of a fatty acid and a fatty acid ester. In some embodiments, the gas oil feedstock comprises at least one of a fatty acid and a fatty acid ester. In some embodiments, the method also includes regenerating said first used catalyst to yield a regenerated first catalyst. In some embodiments, the method also includes using at least a portion of said second used catalyst as said first catalyst. In some embodiments, the method also includes using at least a portion of said regenerated first catalyst as said second catalyst. In some embodiments, the method also includes using said lower olefin compound as an olefin feed to a polyolefin manufacturing system. In some embodiments, the method also includes introducing into said intermediate cracking reactor a ZSM-5 additive. In some embodiments, said suitable catalytic cracking conditions are such as to provide for a conversion of said gas oil feedstock in the range of from 40 to 90 weight percent of the total gas oil feedstock.

The process may include the integration of the intermediate cracking reactor with a system for separating the cracked intermediate reactor product into at least one lower olefin product, or a system for manufacturing a polyolefin, or a combination of both such systems. It is the enhanced production of lower olefins provided by the process that makes it beneficial to integrate the FCC riser reactor and intermediate cracking reactor of the system with the further processing of the cracked intermediate reactor product. Specifically, the increased yield of lower olefins through the use of steam and/or ZSM-5 additive in the intermediate cracking reactor provides the incentive to integrate the aforementioned process steps. Thus, the cracked intermediate reactor product, comprising at least one lower olefin compound, such as, ethylene, propylene, or butylene, may further be passed to a separation system for separating the cracked intermediate reactor product into a lower olefin product comprising at least one lower olefin compound. The lower olefin product may further be used as a feedstock to a polyolefin manufacturing system whereby the lower olefin is polymerized under suitable polymerization conditions preferably in the presence of any suitable polymerization catalyst known to those skilled in the art.

Those of skill in the art will appreciate that many modifications and variations are possible in terms of the disclosed embodiments of the invention, configurations, materials and methods without departing from their spirit and scope.

Accordingly, the scope of the claims appended hereafter and their functional equivalents should not be limited by particular embodiments described and illustrated herein, as these are merely exemplary in nature.

That which is claimed is:

1. A method comprising:
catalytically cracking a gas oil feedstock within an FCC riser reactor zone by contacting under suitable catalytic cracking conditions including a temperature of from 450 to 550° C., within said FCC riser reactor zone said gas oil feedstock with a first catalyst comprising a molecular sieve having cracking activity dispersed in a porous inorganic refractory oxide matrix or binder, to yield an FCC riser reactor product comprising a cracked gas oil product and a first used cracking catalyst, wherein the gas oil feedstock comprises a first portion comprising a heavy hydrocarbon feedstock and a second portion comprising at least one of a fatty acid and a fatty acid ester having from about 12 to about 25 carbon atoms;
providing an intermediate reactor feedstock, wherein the wherein the intermediate reactor feedstock comprises a first portion comprising a hydrocarbon feedstock having a boiling temperature in the gasoline range and a second portion comprising at least one of a fatty acid and a fatty acid ester having from about 6 to about 10 carbon atoms;
contacting the intermediate reactor feedstock with a second catalyst comprising a molecular sieve having cracking activity dispersed in a porous inorganic refractory oxide matrix or binder within an intermediate cracking reactor operated under suitable high severity cracking conditions including a temperature of from about 482° C. to about 871° C., to so as to yield a cracked intermediate reactor product, comprising at least one lower olefin compound, and a second used cracking catalyst; and
separating said cracked intermediate reactor product into a lower olefin product comprising said at least one lower olefin compound.

2. The method of claim 1, further comprising regenerating said first used catalyst to yield a regenerated first catalyst.

3. The method of claim 1, further comprising using at least a portion of said second used catalyst as said first catalyst.

4. The method of claim 2, further comprising using at least a portion of said regenerated first catalyst as said second catalyst.

5. The method of claim 1, further comprising: using said lower olefin compound as an olefin feed to a polyolefin manufacturing system.

6. The method of claim 1, further comprising introducing into said intermediate cracking reactor a ZSM-5 additive.

7. The method of claim 1, wherein said suitable catalytic cracking conditions are sufficient to provide for a conversion of said gas oil feedstock in the range of from 40 to 90 weight percent of the total gas oil feedstock.

8. The method of claim 1, wherein first portion comprises from 70 to 95 percent of the intermediate reactor feedstock, and the second portion comprises from 5 to 30 percent of the intermediate reactor feedstock.

9. The method of claim 8, wherein first portion comprises from 80 to 90 percent of the intermediate reactor feedstock, and the second portion comprises from 10 to 20 percent of the intermediate reactor feedstock.

10. The method of claim 1, wherein the second used cracking catalyst from the intermediate reactor is split into two portions, one portion of which is sent to the FCC riser reaction zone and another portion is sent to a regenerator.

11. The method of claim 1, wherein second catalyst employed in the intermediate reactor is a middle distillate selective cracking catalyst.

12. The method of claim 11, wherein a ZSM-5 additive is used along with the middle distillate selective catalyst in the intermediate reactor.

* * * * *